United States Patent [19]
DeLaquil, Jr.

[11] Patent Number: 4,891,895
[45] Date of Patent: Jan. 9, 1990

[54] LICENSE PLATE HOLDER

[76] Inventor: Pascal DeLaquil, Jr., 111 Williamsburg Dr., Export, Pa. 15632

[21] Appl. No.: 737,429

[22] Filed: May 24, 1985

[51] Int. Cl.$^4$ ............................................... G09F 7/00
[52] U.S. Cl. ....................................... 40/209; 40/201
[58] Field of Search ............... 40/209, 152, 204, 10 R, 40/210, 661, 642, 643, 201; D18/26

[56] References Cited

U.S. PATENT DOCUMENTS

| | | | |
|---|---|---|---|
| 1,820,092 | 8/1931 | Riley | 40/204 |
| 2,128,679 | 8/1938 | Kielian | 40/204 |
| 2,361,479 | 10/1944 | Joffo | 40/10 R |
| 2,753,640 | 7/1956 | McConnell | |
| 2,797,513 | 7/1957 | Edwards, Jr. | 40/10 R |
| 2,827,722 | 3/1958 | Leclerc | 40/209 |
| 2,921,395 | 1/1960 | Fishman | 40/209 |
| 3,187,452 | 6/1965 | Dotson | 40/209 |
| 3,304,642 | 2/1967 | Dardis | 40/209 |
| 3,374,568 | 3/1968 | Trammell, Jr. | 40/209 |
| 3,389,486 | 6/1968 | Trammell, Jr. | 40/209 |
| 3,445,151 | 5/1969 | Stefanakis | 40/156 |
| 4,037,342 | 7/1977 | Bott | 40/156 |
| 4,182,062 | 1/1980 | Krokos et al. | 40/209 |
| 4,302,896 | 1/1981 | Bott | 40/10 R |

Primary Examiner—Joseph Palk
Assistant Examiner—J. Hakomakr
Attorney, Agent, or Firm—Epstein, Edell & Retzer

[57] ABSTRACT

A license plate holder for providing a weather-proof and tamper-proof enclosure for a vehicle license plate includes a backing plate adapted to be secured to the vehicle license plate mount and to have the license plate secured thereto. A cover frame is secured to the backing plate by means of tamper-resistant screws secured between the backing plate and frame without passing through the license plate or a transparent pane held against the license plate by the frame. Gaskets provide weather-proof seals between the frame and pane and between the license plate and pane. The tamper-resistant screws are received in cylindrical female-threaded fasteners which are crimped in place to determine the spacing between the frame and backing plate. The backing plate is provided with four mounting apertures corresponding to four standardly spaced mounting holes in the vehicle license plate mount. Two apertures may be covered by a removable plate having a lower edge adapted to be supported in a channel which is provided as part of certain vehicle license plate mounts.

18 Claims, 3 Drawing Sheets

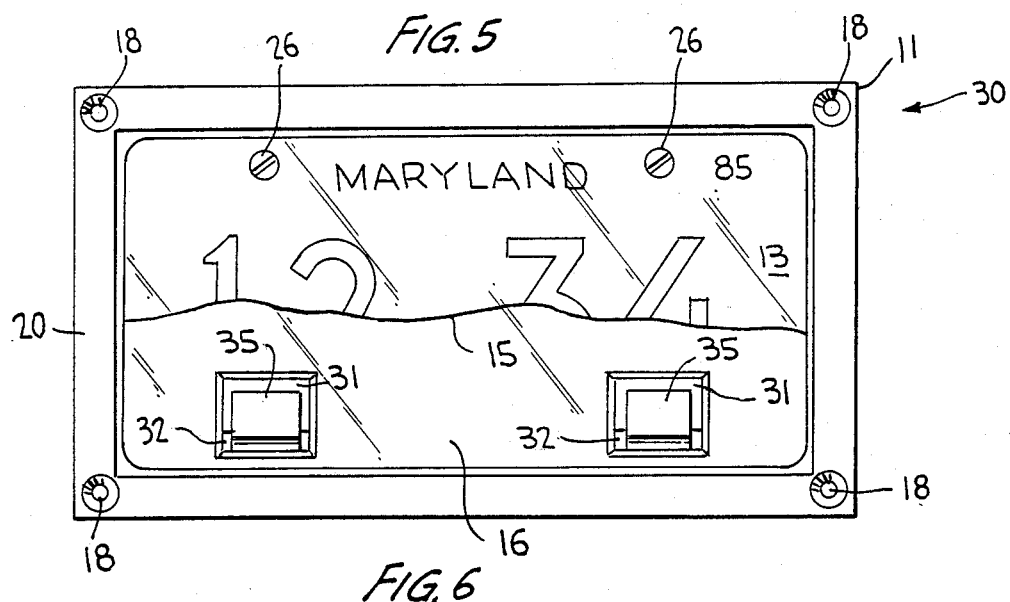
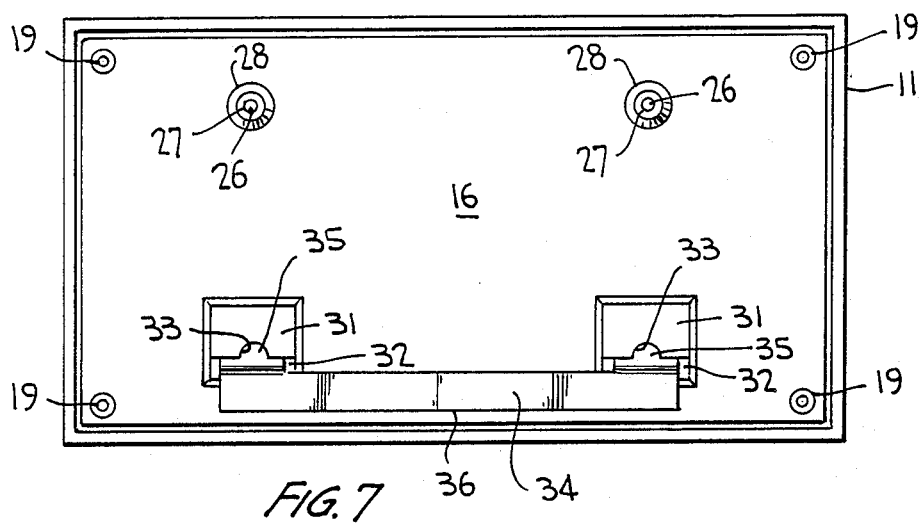
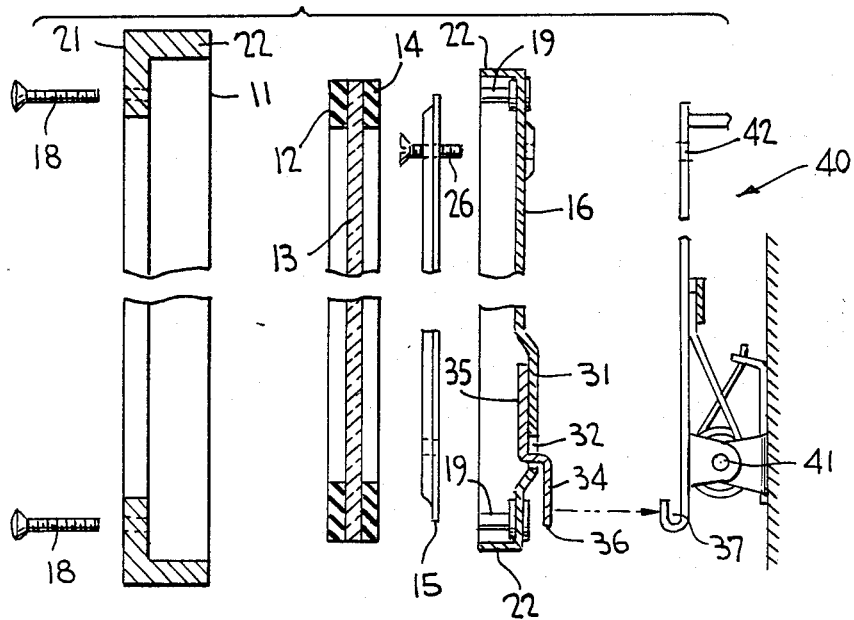

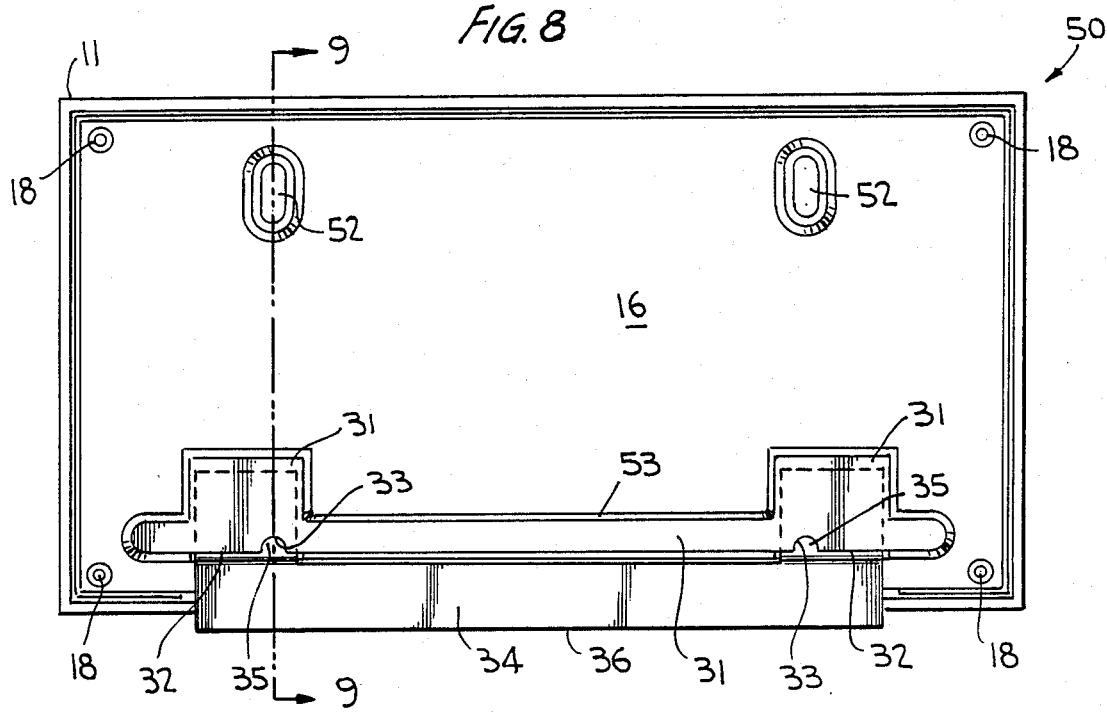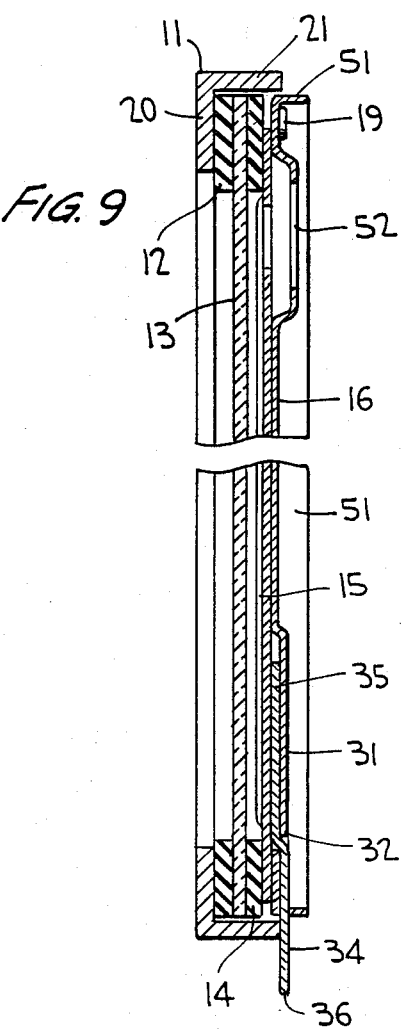

LICENSE PLATE HOLDER

BACKGROUND OF THE INVENTION

1. Technical Field

The present invention relates to vehicle license plate holders and, more particularly, to license plate holders which are tamper-resistant and weather-proof.

2. Discussion of the Prior Art

With increased use of "vanity" vehicle license plates (i.e., vehicle license plates for which an owner's pays an extra fee to obtain plates bearing pre-specified alphanumeric characters), there has become an increased need for license plate holders to protect such plates against the elements and against vandalism. Examples of prior art weather-proof license plate holders may be found in the following U.S. Pat. Nos.: 1,879,906 (Linstrom); 1,927,564 (Goldberg); and 2,865,123 (Glowzinski). Prior art license plate holders having one or more significant disadvantages. Most are expensive to fabricate, requiring many parts, some of which must be mutually movable. Others require holes to be drilled through the transparent cover of glass or other material, leaving the cover subject to breakage, adding to the expensive fabrication, and comprising the weather seal for the enclosure. Finally, none of the prior art license plate holders known to Applicant are tamper-resistant in that an unauthorized individual can open the enclosure as easily as an authorized individual and have access to the license plate. In most cases, such access is obtained with nothing more than a conventional screwdriver.

It is desirable that the owner of a vehicle, or other authorized person, have simple access to the license plate in order to attach annual stickers, or to replace the plate itself. However, access for unauthorized individuals should be as difficult as possible. Further, the assembled structure should be weather-proof, inexpensive to fabricate, and should be capable of being opened and closed by authorized persons without damaging the structure or the license plate.

OBJECTS AND SUMMARY OF THE INVENTION

It is therefore an object of the present invention to provide a weather-proof and tamper-resistant vehicle license plate holder which can be simply attached to a vehicle license plate mounting support.

It is another object of the present invention to provide a vehicle license plate holder which is inexpensive to fabricate and which provides simple access to an enclosure within the holder for authorized individuals but not for unauthorized individuals.

A further object of the present invention is to provide a vehicle license plate holder which can be easily opened and closed by authorized individuals without causing damage to the holder components or to the contained license plate.

In accordance with the present invention, a license plate holder includes a backing plate and a cover frame, both of which are rectangular in configuration with each dimension of the rectangle being slightly larger than the corresponding dimensions of a standard sized vehicle license plate. The backing plate and frame can therefore be secured to one another at their corners by screws which do not have to pass through the enclosed license plate or the protective transparent pane held between the license plate and the frame. The backing plate includes mounting apertures oriented to be aligned with apertures in the license plate and in the license plate mounting support on the vehicle, thereby permitting the backing plate and license plate to be secured together and to the mounting support by means of standard screws. In the preferred embodiment of the invention, cylindrical internally threaded fasteners are disposed at the four corners of the backing plate with annular flanges abutting the rear surface of the backing plate. The open threaded ends of the fasteners project within the enclosure toward the frame Tamper-resistant screws, such as button head socket cap screws (or other non-standard head screws) extend through the frame at the corners to engage the internally threaded fasteners. The fasteners are axially crimpable upon tightening of the tamper-resistant screws to an extent which defines the final spacing between the back surface of the frame member and the front surface of the backing plate. Gasketing is provided at the periphery of the protective transparent pane, on both surfaces of the pane, to seal the pane against both the frame and the license plate. The backing plate is provided with a removable cover for two mounting apertures, the cover being used when the license plate mounting support for the vehicle is such that only two screw holes are provided. In one embodiment, the extra apertures are covered with adhesive tape. In another embodiment, the extra mounting holes are provided in respective recessed pockets formed in the backing plate. The pockets have horizontal slots which receive respective tabs from a metal cover strip so that the tabs cover the aperture while the bottom edge of the strip serves as a support edge adapted to reside in a support ledge provided in certain types of vehicle mounting supports for license plates.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings wherein like reference numerals in the various figures are utilized to designate like components, and wherein:

FIG. 5 is a front view in plan of a second embodiment of the license plate holder of the present invention, and wherein a portion of the license plate is broken away to view one aspect of the backing plate;

FIG. 6 is a rear view in plan of the assembly of FIG. 5;

FIG. 7 is an exploded view in section of the license plate holder of FIGS. 5 and 6;

FIG. 8 is a rear view in plan of still another license plate holder embodiment constructed in accordance with the present invention; and FIG. 9 is a view in section taken along lines 9—9 of the embodiment of FIG. 8.

DESCRIPTION OF THE PREFERRED EMBODIMENTS

Figure 1:
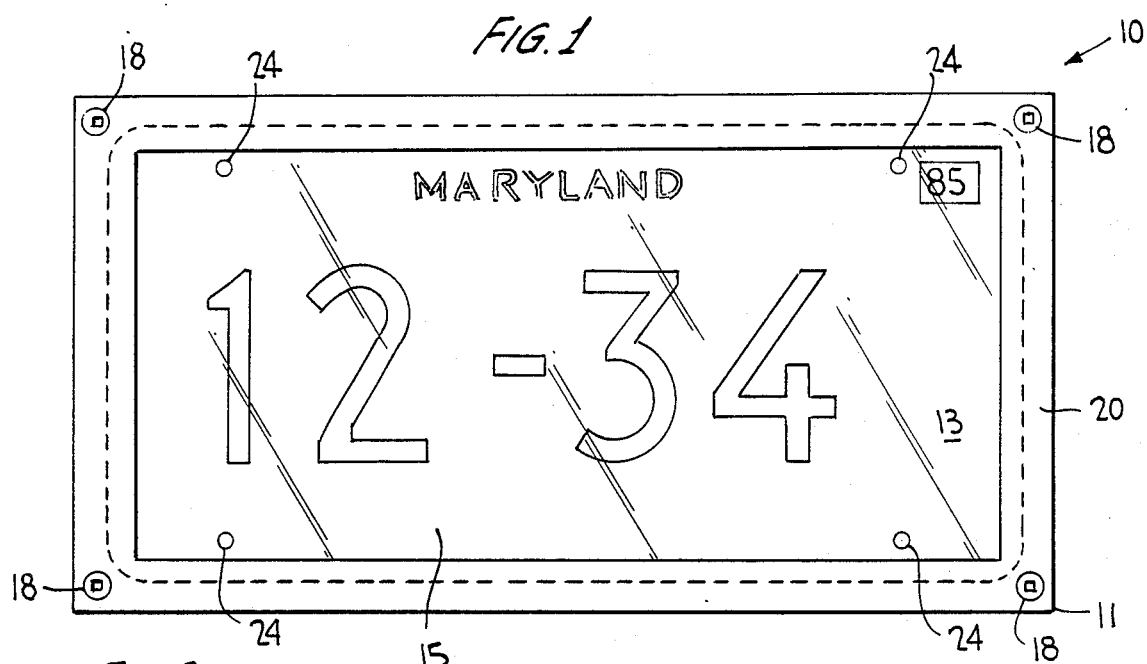
FIG. 1 is a front view in plan of an assembled license plate holder constructed in accordance with the present invention.
Figure 2:
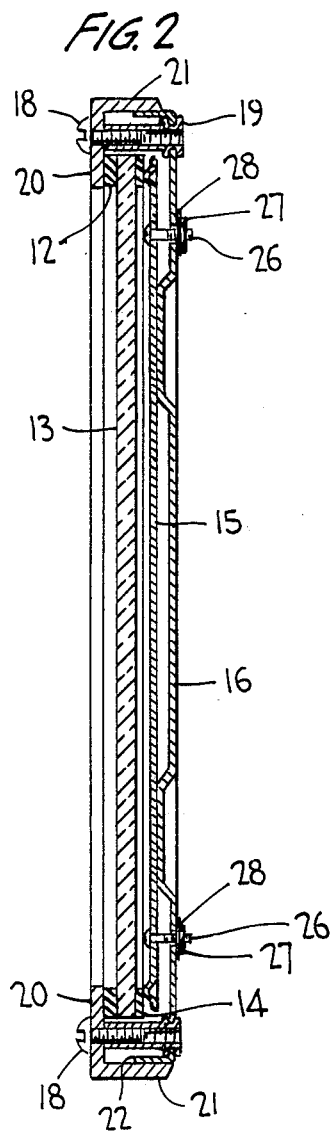
FIG. 2 is a view in vertical section of the license plate holder of FIG. 1.
Figure 3:
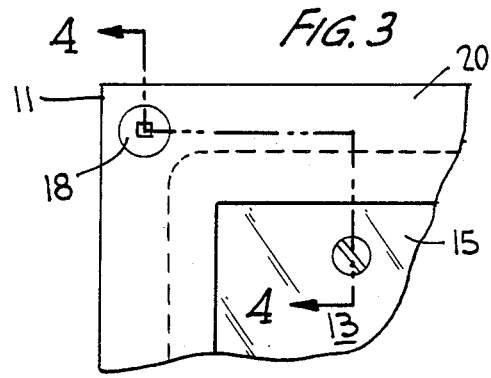
FIG. 3 is a partial view in plan of a corner portion of the assembly of FIG. 1.
Figure 4:
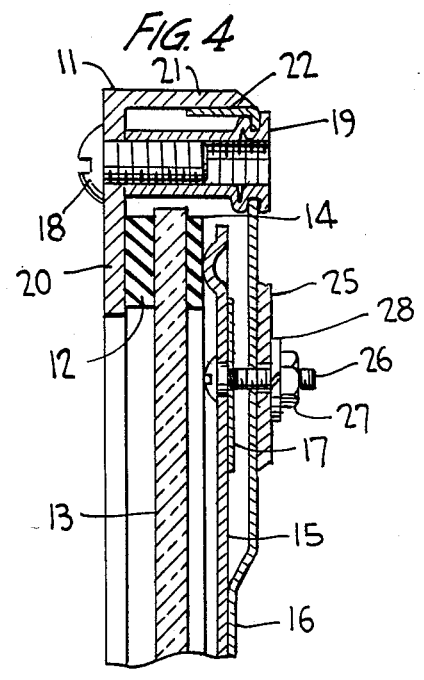
FIG. 4 is a view in section taken along lines 4—4 of FIG. 3.

Referring specifically to FIGS. 1-4 of the accompanying drawings, a first license plate holder embodiment 10 of the present invention includes a rectangular main exterior cover frame 11, a primary sealing gasket 12, a protective transparent pane 13, a secondary sealing gasket 14, a vehicle license plate 15, a rectangular backing plate 16, an adhesive tape cover 17 for holes in the license plate, four tamper-resistant closure screws 18 and four axially crimpable thread fasteners 19. Cover frame 11 includes a vertical portion 20 and a horizontal portion 21 extending rearwardly from vertical portion 20. The vertical portion 20 frames a rectangular viewing area through which the license plate 15 may be observed. The cut away portion defining the viewing area is smaller than the standard sized license plate 15 in both dimensions. However, the vertical portion 20, having a front surface and a back surface, is larger in both dimensions of its rectangular configuration than the standard sized license plate 15, thereby providing four corners of the vertical portion 20 of frame member 11 which extend beyond corresponding corners of the license plate 15 when the license plate is centered in the frame. Four screw-receiving holes are defined through frame member 11 at these corners so that tamper-resistant screws 18 can be inserted through the vertical portion 20 of the frame member.

Protective transparent pane member 13 is disposed behind the back surface of frame member 11 and is spaced from the vertical portion 20 by means of sealing gasket 12 secured to the forward-facing surface of pane member 13 proximate the edges of the pane member. Pane member 13 may be tempered, heat-strengthened, annealed glass, acrylic, polycarbonate, or other suitable material which is strong and shatter-proof but transparent to permit viewing of the license plate 15 disposed behind the pane through the opening in frame member 11. The rectangular dimensions of pane 13 are approximately the same as those of the license plate 15, it being important that the pane dimensions are slightly larger than the dimensions of the rectangular viewing opening defined in frame member 11. The second sealing gasket 14 is secured to pane member 13 on the rearward-facing surface of the pane, proximate the pane periphery, to provide a sealing function between the pane and license plate 15. Sealing gaskets 12 and 14 are preferably made of neoprene, or the like, to effect the desired sealing function. Frame member 11 is preferably made of cast white bronze which may be burnished to provide a chrome-like appearance.

Backing plate 16 has a generally rectangular configuration which is larger in both dimensions than the corresponding dimensions of the standard sized license plate 15 but slightly smaller than the corresponding dimensions of frame member 11. In this regard, backing plate 15 includes a peripheral forwardly extending flange 22 about its entire periphery which slidably fits within the horizontal portion 21 of frame member 11. Flange 22 and the horizontal portion 21 of frame member 11 thus abut one another to define an enclosure within which pane 13 and license plate 15 are disposed. Four holes are defined at respective corners of the backing plate to receive respective thread fasteners 19, these holes being aligned with the corresponding corner holes in frame member 11 so that the thread fasteners 19 are oriented to receive the closure screws 18 in threaded engagement. Importantly, both the screws 18 and fasteners 19 extend into the enclosure in respective spaces which are beyond the peripheries of protective pane 13 and license plate 15. Backing plate 16 is provided with four mounting apertures oriented and spaced so as to be aligned with mounting holes provided for license plates on automotive vehicle mounting supports for such license plates. These mounting apertures are also aligned with respective apertures 24 defined in license plate 15. The backing plate 16 and license plate 15 can thus be secured together as a unit to the standard vehicle mounting support 25 for the vehicle license plate by means of mounting screws 26, nuts 27 and washers 28. Hardware elements 26, 27 and 28 are commonly supplied with the vehicle for securing the license plate 15 thereto.

Thread fasteners 19 have annular flanges which abut the rear surface of backing plate 16 so that the hollow cylindrical portion of the thread fasteners extend through the mounting apertures to receive tamper-resistant screws 18. The portion of the fastener 19 which extends into the enclosure is generally cylindrical and is axially crimpable as the screw 18 is tightened within the threaded interior of the fastener. The fastener 19 is thus crimped in place and serves as a spacer between the frame 11 and backing plate 16 to prevent over-tightening which might cause undue stress and breakage in the protective pane 13. Tamper-resistant screws 18 are preferably of the button head socket cap type, made of stainless steel so as to be weather-resistant. The socket cap configuration (in effect, a rectangular hole in the head of the screw) is the preferred form of tamper-resistant screw; however, other types of tamper-resistant screw may be employed. The key factor is that the straight slotted head, or Phillips head, screw should not be used since screwdrivers for actuating such screws are readily available. Rather, a special head configuration or a head configuration requiring screwdrivers of an uncommon type, are required to effect the tamper-resistant feature of the present invention. In addition to the tamper-resistant feature, and the spacing feature provided by the crimpable fasteners 19, it must be repeated that the location of the screws and fasteners beyond the boarders of the license plate 15 and pane 13 permit the enclosure to be secured without passing through the license plate or pane.

The backing plate may be made of the same material as the frame member 11 which, in the example described above, is cast white bronze. Alternatively, the backing plate 16 and frame 11 may be made of other metal or plastic material consistent with the functional characteristics described herein. One such functional characteristic is the provision of an enclosure which can be simply opened by authorized individuals with an appropriate tool (i.e., special screwdriver) in order to replace the license plate 15 or apply an annual sticker thereto. All that is required is the removal of the four tamper-resistant screws which permits the frame member 11 and pane 13 to be removed from the joined license plate 15 and backing plate 16. The tamper-resistant closure screws 18 are separate and apart from the mounting screws 26, the latter being used to mount the overall assembly to a conventional vehicle license plate mount via the standardized mounting apertures and holes. The separation of the closure screws from the mounting screw eliminates the need to drill holes through pane 13, thereby avoiding the expense of doing so as well as the difficult of maintaining a weather-proof enclosure when holes are incorporated in the pane.

The adhesive tape 17 is used to seal the mounting apertures in the license plate 15 when such mounting apertures are not utilized to secure the license plate 15 and backing plate 16 to the license plate mounting support 25 of the vehicle. Thus, the situation illustrated in FIG. 4, wherein screw 26 and tape 17 are both present, is unrealistic but is illustrated in order to reduce the number of drawings while illustrating the concept of using the tape 17 to seal the license mounting apertures. In other words, it is possible that only two mounting apertures, rather than all four, would be utilized to secure the license plate 15 and backing plate 16 to the mounting support 25. Under such circumstances, the tape 17 would be maintained on the two unused mounting apertures to seal those apertures in license plate 15.

Referring now to FIGS. 5-7 of the accompanying drawings, a second embodiment of the present invention is illustrated wherein similar components to those in the embodiment of FIGS. 1-4 are designated by the same reference numerals. The embodiment of FIGS. 5-7 differs in the manner of sealing the mounting apertures. Specifically, in the embodiment of FIGS. 5-7, the mounting apertures in the backing plate 16, rather than in the license plate 15, are sealed. More particularly, backing plate 16 is provided with pockets 31 in the region of the two lower mounting apertures defined as respective recesses in the front surface of the backing plate and as rearward projections in the rear surface of the backing plate. A horizontally extending slot 32 is defined in each pocket as a cut away portion of the recess between two edges. The upper slot-defining edge has the major portion of a circular aperture 33 defined therein so that the two apertures 33 serve as the two lower mounting apertures for backing plate 16. By "major portion" it is meant that more than 180° of the circular aperture is cut upwardly into the upper edge which defines slot 32. Apertures 33 are aligned with suitable apertures in license plate 15 so that the backing plate 16 and license plate 15 can be assembled in the manner described above in relation to FIG. 1 in connection with the mounting support 25 for the license plate illustrated in FIG. 4. An elongated support strip 34 is wide enough to span a horizontal distance greater than the spacing between the most mutually remote portions of the lower mounting apertures 33. Elongated support strip 34 is disposed rearwardly of backing plate 16 and includes a pair of tab members 35 at its opposite ends. Tab members 35 are adapted to fit through slots 32 into the enclosure region in front of the backing plate 16. In this regard, tabs 35 are first bent forwardly at approximately right angles to the vertically oriented support strip 34 and then again upwardly at right angles so as to reside along the front surface of the backing plate 16 in pocket 31 when properly inserted in slot 32. In this position, the bottom edge 36 of the support strip resides along a linear path spaced from the unrecessed portion of the backing plate so as to permit the support edge 36 to fit into a support channel 37 provided in certain types of license plate support mounts on some motor vehicles. A typical such mount is generally designated by the reference numeral 40 in FIG. 7. Support mount 40 is generally provided as part of a mechanism for mounting a license plate which covers access to a cap for a gasoline tank on the vehicle. The entire support mount is pivotable about an axis 41 in a conventional manner to provide access to the gasoline tank. When support strip 34 is deployed with tabs 35 properly inserted into slots 32, support edge 36 rests in channel 37 while the upper two mounting apertures defined in backing plate 16 are aligned with corresponding mounting holes 42 in the support mount 40. The license plate 15 and backing plate 16 are thus secured by screws 26 to the support mount 40 at mounting holes 42 while the bottom edge 36 of the support strip rests in channel 37. When the support strip 34 is removed from the slots 32, the license plate holder assembly 30 can be used with license plate support mounts of the type having four conventional mounting holes.

The license plate holder embodiment 50 illustrated in FIGS. 8 and 9 has elements which are similar to those illustrated in the embodiments of FIGS. 1 and 5 and which are designated by the same reference numerals. The embodiment of FIGS. 8 and 9 differs from the embodiment of FIGS. 5-7 in a few respects. First of all, instead of having a forwardly projecting flange 22 at its periphery, backing plate 16 has a rearwardly projecting flange 51 which is cut away along its bottom to permit the support strip 34 to extend through flange 51 downwardly past the lowermost portion of frame member 11. All of the mounting apertures defined in the backing plate 16 are formed in recesses, but only the two lowermost recesses are provided as pockets 31 with access slots 32 for the tabs 35 of the support strip 34. The two uppermost mounting apertures 52 are vertically elongated, rather than being circular, to provide for some vertical adjustment of the positioning of the assembly relative to the license plate support mount located on the vehicle. Finally, the pockets 31 for the lowermost mounting holes 33 are provided as part of a common recess; that is, the backing plate 16 includes a recesses strip 53 extending horizontally between the two pockets 31 and preferably somewhat beyond the two pockets so as to define an easily formed common recess. The rearwardly projecting recessed portion 53 provides further support for the elongated mounting strip 34 along the upper edge of the mounting strip when the mounting edge 36 is disposed in a channel such as channel 37 of FIG. 7.

From the foregoing description it will be appreciated that the invention makes available a novel license plate holder which provides both weather-proof and tamper-resistant functions and which is adaptable to be attached to a wide variety of license plate support mounts available on different models of motor vehicles.

Having described preferred embodiments of a new and improved license plate holder constructed in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

I claim:

1. A license plate holder for providing a weather-proof and tamper-proof enclosure for a standard size vehicle license plate and adapted for connection to a license plate mounting support secured to a vehicle, the mounting support having at least two screw-receiving holes spaced by a standardized distance to permit the license plate to be secured to the mounting support by means of respective mounting screws extending through respective apertures in the license plate into and secured in the holes, said license plate holder comprising:

a backing plate having a front surface, a rear surface, and at least one dimension larger than a corresponding dimension of said license plate, there being two mounting apertures defined in the backing plate and spaced by said standardized distance for alignment with said license plate apertures, said two mounting apertures being located to expose first and second end portions of said forward surface when said license plate is placed against said forward surface with said license plate apertures aligned with said mounting apertures;

means securing said license plate and said backing plate to said mounting support with the license plate disposed adjacent said forward surface and said mounting support disposed adjacent said rear surface, said securing means comprising respective mounting screws extending through said license plate apertures and said mounting apertures into said holes in said mounting support;

a frame member having four sides defining an open area therebetween, said frame member having a front surface and a back surface;

a transparent pane member having a surface area slightly larger than said open area but smaller in said at least one dimension than said frame member and said backing plate, said pane member being disposed between the back surface of said frame member and said license plate;

wherein said frame member is larger in said at least one dimension than said license plate such that first and second end segments of said frame member are spaced from and aligned with said first and second end portions, respectively, of said backing plate without any portions of said pane member and said license plate interposed therebetween; and removable means for selectively securing said frame member to said backing plate, said removable means including first engagement means joining said first end segment of said frame member to said first end portion of said backing plate, and second engagement means for securing said second end segment of said frame member to said second end portion of said backing plate.

2. The license plate holder according to claim 1 wherein each of said first and second engagement means includes a closure screw having a head portion exposed at the front surface of said frame member, and spacer means for setting the minimum spacing between the back surface of said frame member and the front surface of said backing plate, said spacer means engaging the rear surface of said backing plate and having a tapped bore for receiving said closure screw.

3. The license plate holder according to claim 2 wherein each closure screw is a tamper-resistant button head socket cap screw.

4. The license plate holder according to claim 2 wherein said spacer means comprises a hollow cylindrical member containing said tapped bore for receiving said closure screw, said cylindrical member being axially longer than the space between said backing plate and said frame member and being axially crimpable, upon tightening of said closure screw therein, to a length which defines said space.

5. The license plate holder according to claim 4 wherein said license plate, said backing plate, said transparent pane and said frame member are generally rectangular, wherein said backing plate and said frame are both larger in each of two rectangular dimensions than said license plate and said transparent pane, wherein said end portions are four corner areas of said backing plate, and wherein said end segments are four corner areas of said frame member aligned with the four corners, respectively of said backing plate.

6. The license plate holder according to claim 5 further comprising:
first gasket means for providing a liquid seal between the back surface of said frame member and said transparent pane member; and
second gasket means for providing a liquid seal between the transparent pane member and the license plate.

7. The license plate holder according to claim 5 wherein said at least two screw receiving holes define a first straight line extending horizontally when said license plate holder is in use, and wherein said license plate mounting support includes two additional standardly spaced screw-receiving holes defined therein to define a second horizontally-extending straight line disposed vertically below said first straight line, wherein said backing plate has two additional mounting apertures defined therein at locations which are aligned with said two additional screw-receiving holes and correspond to additional apertures in said license plate, and further comprising selectively detachable means for covering said two additional mounting apertures.

8. The license plate holder according to claim 7 wherein said selectively detachable means comprises adhesive tape covering said two additional mounting holes.

9. The license plate holder according to claim 7 wherein said backing plate has first and second recessed pockets defined therein as rearwardly projecting recesses, each pocket having a horizontally-extending access slot defined between two slot edges, wherein said two additional screw-receiving holes ar defined in respective pocket-forming recesses, and wherein said detachable means comprises an elongated support strip having first and second elongated edges, and first and second spaced tabs adapted to fit into said first and second recessed pockets, respectively, from the rear surface of said backing plate through said access slots so as to extend along the front surface of said backing plate, leaving said first elongated edge extending horizontally behind and in spaced relation to the rear surface of said backing plate.

10. The license plate holder according to claim 1 further comprising:
first gasket means for providing a liquid seal between the back surface of said frame member and said transparent pane member; and
second gasket means for providing a liquid seal between the transparent pane member and the license plate.

11. The license plate holder according to claim 1 wherein said at least two screw receiving holes define a first straight line extending horizontally when said license plate holder is in use, and wherein said license plate mounting support includes two additional standardly spaced screw-receiving holes defined therein to define a second horizontally-extending straight line disposed vertically below said first straight line, wherein said backing plate has two additional mounting apertures defined therein at locations which are aligned with said two additional screw-receiving holes and correspond to additional apertures in said license plate, and further comprising selectively detachable means for covering said two additional mounting apertures.

12. The license plate holder according to claim 11 wherein said backing plate has first and second recessed pockets defined therein as rearwardly projecting recesses, each pocket having a horizontally-extending access slot defined between two slot edges, wherein said tow additional screw-receiving holes are defined in respective pocket-forming recesses, and wherein said detachable means comprises an elongated support strip having first and second elongated edges, and first and second spaced tabs adapted to fit into said first and second recessed pockets, respectively, from the rear surface of said backing plate through said access slots so as to extend along the front surface of said backing plate, leaving said first elongated edge extending horizontally behind and in spaced relation to the rear surface of said backing plate.

13. The license plate holder according to claim 1 wherein said license plate, said backing plate, said transparent pane and said frame member are generally rectangular, wherein said backing plate and said frame are both larger in each of two rectangular dimensions than said license plate and said transparent pane, wherein said end portions are four corner areas of said backing plate, and wherein said end segments are four corner areas of said frame member aligned with the four corners, respectively of said backing plate.

14. A license plate holder of the type wherein a backing plate having front and rear surfaces is adapted to be secured to a vehicle license plate mounting support and to have a license plate secured thereto, wherein a frame member having front and back surfaces is adapted to form an enclosure for said license plate when secured to the backing plate with a transparent pane member held in place between the frame member and the license plate, said license plate holder comprising:

four corners of said backing plate aligned with four respective corners of said frame member across said enclosure without any portions of said license plate and pane member interposed therebetween; and removable means for selectively securing said frame member to said backing plate, said removable means comprising four engagement means extending across said enclosure from respective four corners of said backing plate to respective four corners of said frame member.

15. The license plate holder according to claim 14 wherein each of said engagement means comprises a closure screw having a head portion exposed at the front surface of said frame member, and spacer means for setting the minimum spacing between the back surface of said frame member and the front surface of said backing plate, said spacer means engaging the rear surface of said backing plate and having a tapped bore for receiving said closure screw.

16. The license plate holder according to claim 15 wherein each closure screw is a tamper-resistant button head socket cap screw.

17. The license plate holder according to claim 15 wherein said spacer means comprises a hollow cylindrical member containing said tapped bore for receiving said closure screw, said cylindrical member being axially longer than the space between said backing plate and said frame member and being axially crimpable, upon tightening of said closure screw therein, to a length which defines said space.

18. The license plate holder according to claim 15 further comprising:

first gasket means for providing a liquid seal between the back surface of said frame member and said transparent pane member; and second gasket means for providing a liquid seal between the transparent pane member and the license plate.

* * * * *